US010997855B2

(12) United States Patent
Max et al.

(10) Patent No.: US 10,997,855 B2
(45) Date of Patent: May 4, 2021

(54) METHOD AND DEVICE FOR COLLECTING TRANSPORTATION VEHICLE-BASED DATA RECORDS FOR PREDETERMINED ROUTE SECTIONS

(71) Applicants: VOLKSWAGEN AKTIENGESELLSCHAFT, Wolfsburg (DE); AUDI AG, Ingolstadt (DE)

(72) Inventors: Stephan Max, Gifhorn (DE); Edson William Fangwa Nzeya, Böhmfeld (DE)

(73) Assignees: Volkswagen AG; Audi AG

(*) Notice: Subject to any disclaimer, the term of this patent is extended or adjusted under 35 U.S.C. 154(b) by 0 days.

(21) Appl. No.: 16/675,987

(22) Filed: Nov. 6, 2019

(65) Prior Publication Data
US 2020/0143676 A1   May 7, 2020

(30) Foreign Application Priority Data
Nov. 7, 2018   (DE) .................... 10 2018 008 731.0

(51) Int. Cl.
*G08G 1/0967*   (2006.01)
*G08G 1/01*   (2006.01)
(Continued)

(52) U.S. Cl.
CPC ..... *G08G 1/096775* (2013.01); *G08G 1/0112* (2013.01); *H04L 69/22* (2013.01); *H04W 4/38* (2018.02); *H04W 4/40* (2018.02)

(58) Field of Classification Search
None
See application file for complete search history.

(56) References Cited

U.S. PATENT DOCUMENTS 7,680,594 B2 * 3/2010 Cabral ............. G08G 1/096775
701/423
7,849,149 B2 * 12/2010 Habaguchi ............ H04L 67/125
709/207
(Continued)

FOREIGN PATENT DOCUMENTS

DE   102016207076 A1   11/2016
DE   102016009195 B3   12/2017

*Primary Examiner* — Chico A Foxx
(74) *Attorney, Agent, or Firm* — Barnes & Thornburg LLP

(57) ABSTRACT

A method and apparatus for transmitting vehicle-based environmental data relating to at least one transportation vehicle traveling on a predefined road section to a backend for the purpose of collecting data records relating to the road section. The method generates data relating to the environment of the transportation vehicle by an environment sensor system; generates quality parameters relating to the sensors in the environment sensor system, wherein the quality parameters enable a statement regarding the performance of the sensors; combines the quality parameters and the measurement data to form a data record and creating a summary relating to the data record; transmits the header to the backend; checks the quality parameters of the header; and rejects the header in response to the quality parameters not complying with a predetermined quality standard or retains the header for further processing in response to the quality parameters complying with the predetermined quality standard.

17 Claims, 1 Drawing Sheet

(51) Int. Cl.
*H04L 29/06* (2006.01)
*H04W 4/38* (2018.01)
*H04W 4/40* (2018.01)

(56) References Cited

U.S. PATENT DOCUMENTS

| | | | | |
|---|---|---|---|---|
| 8,041,779 B2* | 10/2011 | Habaguchi | | G06Q 10/063 709/219 |
| 8,046,162 B2* | 10/2011 | Nonaka | | G08G 1/096716 701/423 |
| 9,109,913 B2* | 8/2015 | Lu | | G08G 1/0129 |
| 9,291,471 B2* | 3/2016 | Ikawa | | G01C 21/3492 |
| 9,773,410 B2* | 9/2017 | Vorona | | G08G 1/0133 |
| 10,141,967 B1* | 11/2018 | Mitra | | G06F 9/547 |
| 2002/0077741 A1* | 6/2002 | Hanebrink | | G08G 1/096775 701/117 |
| 2003/0191572 A1* | 10/2003 | Roll | | B60T 8/17551 701/70 |
| 2009/0138188 A1* | 5/2009 | Kores | | G01C 21/32 701/117 |
| 2011/0208426 A1* | 8/2011 | Zheng | | G01C 21/30 701/532 |
| 2011/0246022 A1* | 10/2011 | Bai | | B60H 1/00771 701/36 |
| 2012/0082273 A1* | 4/2012 | Chang | | H04B 17/309 375/346 |
| 2012/0314608 A1* | 12/2012 | Okuno | | H04L 67/2828 370/252 |
| 2013/0279427 A1* | 10/2013 | Wentink | | H04W 28/18 370/329 |
| 2014/0188327 A1* | 7/2014 | Jung | | F01N 3/2066 701/29.2 |
| 2015/0094948 A1* | 4/2015 | Lu | | B60G 17/018 701/410 |
| 2015/0262485 A1* | 9/2015 | Rennie | | H04W 24/08 340/905 |
| 2016/0080838 A1* | 3/2016 | Kim | | H04W 4/38 340/870.07 |
| 2016/0293000 A1* | 10/2016 | Torgerson | | H04W 4/14 |
| 2016/0358462 A1 | 12/2016 | Kao et al. | | |
| 2017/0195451 A1* | 7/2017 | Backholm | | H04L 67/2852 |
| 2018/0005525 A1* | 1/2018 | Parundekar | | H04L 67/12 |
| 2018/0024238 A1* | 1/2018 | Khlifi | | B60W 30/12 342/52 |
| 2018/0113898 A1* | 4/2018 | Hall | | G06F 16/215 |
| 2018/0144631 A1* | 5/2018 | Neumann | | H04W 4/025 |
| 2019/0084369 A1* | 3/2019 | Duan | | B60H 1/00771 |
| 2019/0146508 A1* | 5/2019 | Dean | | G05D 1/0274 701/26 |
| 2019/0303693 A1* | 10/2019 | Watanabe | | G05D 1/0276 |
| 2020/0211385 A1* | 7/2020 | Johnson | | G06Q 50/30 |

* cited by examiner

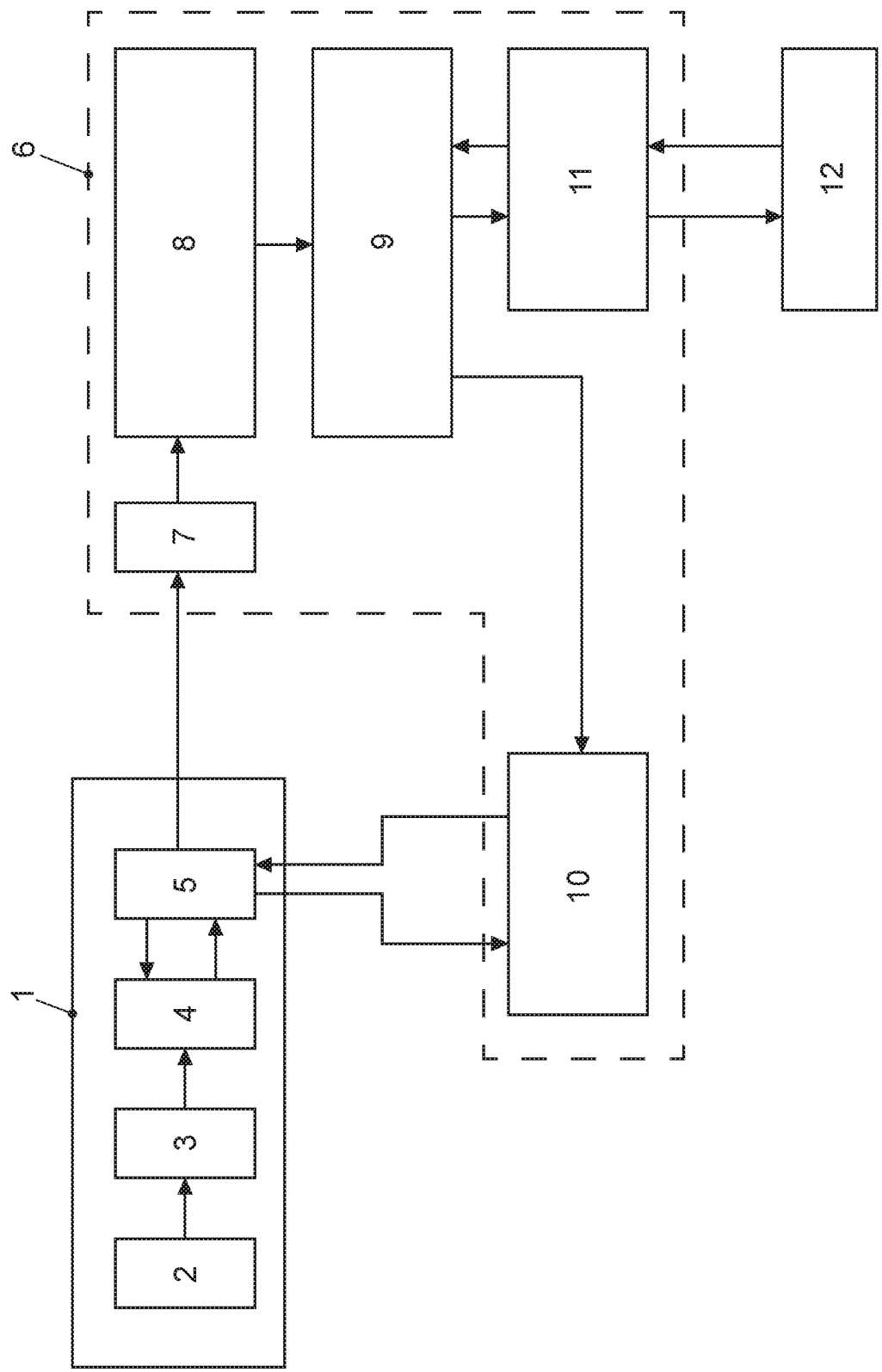

METHOD AND DEVICE FOR COLLECTING TRANSPORTATION VEHICLE-BASED DATA RECORDS FOR PREDETERMINED ROUTE SECTIONS

PRIORITY CLAIM

This patent application claims priority to German Patent Application No. 10 2018 008 731.0, filed 7 Nov. 2018, the disclosure of which is incorporated herein by reference in its entirety.

SUMMARY

Illustrative embodiments relate to a method for transmitting transportation vehicle-based environmental data to a backend computer, referred to as backend below, for the purpose of collecting data records relating to predefined route sections and to a corresponding apparatus.

BRIEF DESCRIPTION OF THE DRAWINGS

A disclosed embodiment is explained below based on the drawing, in which:

FIG. 1 shows a schematic illustration of the apparatus for creating data records relating to predefined route sections.

DETAILED DESCRIPTION

Various interactive electrical series systems for assisting the driver have been developed in recent years. The integrated assistance and comfort systems use various sensors to capture the environment of the transportation vehicle to make the journey safer and more comfortable and, in this manner, generate current data relating to the environment currently being traveled through, that is to say the route section currently being traveled on.

Since the transportation vehicles are already equipped with various sensor systems, it is useful to collect and comprehensively use these data. This trend is reinforced by two changed boundary conditions. On the one hand, systems which have been previously offered as optional have become standard equipment as a result of the continuously increasing safety requirements of, for example, NCAP (New Car Assessment Program). On the other hand, a mobile radio connection in the transportation vehicle has been legally prescribed as a result of the compulsion for the electronic emergency call system, also called eCall. Therefore, it is possible to directly collect and communicate the environmental data in a location-based and time-synchronized manner.

Different data classes are captured in the transportation vehicle itself. With respect to the environment, the data are subdivided as follows:
geo-information relating to the geographical phenomena which are directly and indirectly associated with a position based on the Earth,
traffic data, that is to say a description of the states of all objects involved in the traffic,
location-based event data, for example, local danger points which occur at certain points, and
location-based state data, namely continuously capturable data, for example, temperature, parking space occupancy, traffic light condition, variable traffic signs, etc.

In previous systems for determining so-called swarm data, that is to say environmental data generated by a swarm of transportation vehicles, the data are simply, in most cases, directly forwarded from the transportation vehicle to the backend computer, however, wherein the determined data packets are captured in the transportation vehicle and are transmitted without change to the backend computer, in which case that part of an IT system which deals with the data processing in the background is referred to as the backend or backend computer. Intelligent processing of the transmitted data and checking of the data for plausibility are usually not carried out.

The document DE 10 2016 009 195 B3 relates to a method for extracting transportation vehicle data from a transportation vehicle used by a user, wherein a plurality of communication buses in the transportation vehicle are coupled via a gateway device and messages are respectively received from one of the communication buses and are forwarded to another of the communication devices by the gateway device during use of the transportation vehicle and selection data, which describe at least one attribute of the transportation vehicle data to be extracted, are received by a communication device from a stationary server apparatus outside the transportation vehicle. Provision is also made for those message data which have the at least one attribute to be detected in the received messages in the gateway device by a filter device and for the detected message data to be copied and for the transportation vehicle data to be extracted to be obtained from the copied message data and for the extracted transportation vehicle data to be transmitted to the server apparatus by the communication device.

The document US 2016/0358462 A1 describes a method and an apparatus for integrating transportation vehicle data, which relates, in particular, to establishing a relationship between the transportation vehicle license plate number of a transportation vehicle and an electronic identification number of an electronic toll system. In this case, the method comprises the following:
recording a multiplicity of transportation vehicle data items and transmitting the transportation vehicle data to a data filter,
configuring the data filter to determine the quality of the transportation vehicle data,
reading a multiplicity of contents of the various properties of the transportation vehicle data and transmitting the contents to a server,
configuring the server to determine whether there are at least two different properties within a predetermined interval of time,
merging the contents in at least one data record and transmitting the data record to a buffer memory to check whether any of the data records in the buffer has occurred within a predetermined number of times, and
transmitting at least one data record, which has occurred more than the predetermined number of times, to a database.

The document DE 10 2016 207 076 A1 relates to a method for rendering transportation vehicle information, comprising receiving a request for information from an application of a user device. The request identifies the application requesting transportation vehicle information. A filter is used to determine whether the requested data are permissible information. The permissible information comprises information which the transportation vehicle is authorized to output to the user device. A format information type for the output to the user device is determined. A quality level of information for provision to the user device is determined. The quality level of the information is determined as a function of variable parameters in response to the fact that the requested information is permissible information. The transportation vehicle information is processed as a function of the quality of the information and the format type of the information. The processed transportation vehicle information is output to the user device.

The disclosed embodiments provide a method for transmitting transportation vehicle-based data, in particular, route-based environmental data, to a backend computer for the purpose of creating route-based data records and a corresponding apparatus, in which case the quality of the collected data is intended to be ensured.

The disclosed method for transmitting transportation vehicle-based environmental data relating to at least one transportation vehicle traveling on a predefined road section to a backend for the purpose of collecting data records relating to the predefined road section comprises:

generating data relating to the environment of the transportation vehicle by an environment sensor system,
generating quality parameters relating to the sensors in the environment sensor system, wherein the quality parameters enable a statement regarding the performance of the sensors,
combining the quality parameters and the measurement data to form a data record and creating a summary relating to the data record, a so-called header,
transmitting the header to the backend,
checking the quality parameters of the header in the backend, and
rejecting the header if the quality parameters do not comply with a predetermined quality standard or retaining the header for further processing if the quality parameters comply with the predetermined quality standard.

The quality parameters may relate to the functionality of the sensors in the environment sensor system, which can be derived, for example, from the operating data of the sensor(s).

The quality parameters can determine the quality of a sensor in the sensor system on the basis of the measured values from one or more other sensors in the sensor system or of the transportation vehicle. A brightness detector of the transportation vehicle can therefore be used to determine whether the brightness of the environment is sufficient for a camera system.

The predefined standard may determine whether or not the performance of the sensor system is sufficient to carry out the measurements. Various assessments which can assume the values "sufficient", "sufficient to a limited extent" or "insufficient" as the result, for example, as may be the case in the case of the brightness or on the basis of the operating data, can come into consideration as standards. However, a binary assessment in the sense of "okay" and "not okay" is sufficient.

As a function of the header, the associated data record may be retrieved from the transportation vehicle if the quality is sufficient. In other words, if the quality of the quality parameters concomitantly transmitted in the header is sufficient, the data record associated with the header can be retrieved from the transportation vehicle.

The retrieved data record may be stored in the backend for further use and possibly processing. Transmission to a customer is usefully carried out only when all data records desired by the customer are available.

A data record may be retrieved, as a function of the header, only when there is a corresponding request from a customer. If there is no order, the data record is not retrieved from the transportation vehicle and expires after a predefined expiry time.

The request for data records relating to a predefined route section may be made by a customer who communicates exclusively with the backend via an interface to thus make his requests and to receive the requested data records in the opposite direction.

The customer may determine the measurement parameters for creating the data record(s) relating to a predefined route section, with the result that the backend can determine, on the basis of the headers provided by the transportation vehicle(s), whether corresponding data records can be retrieved from the transportation vehicle(s) and can be made available to the customer.

The disclosed apparatus for transmitting transportation vehicle-based environmental data relating to a transportation vehicle traveling on a predefined road section to a backend for the purpose of collecting data records relating to the predefined road section, wherein the apparatus is set up and designed to carry out the method described above, comprises at least one transportation vehicle with an environment sensor system for determining environmental data, a quality parameter device for determining the performance of sensors in the environment sensor system by quality parameters, a data aggregator for creating data records from the measured environmental data and the quality parameters and a summary for each data record, and a communication device for communication between the transportation vehicle and the backend,
a backend with which the transportation vehicle communicates, wherein the backend has a communication device for communicating with the transportation vehicle(s), a device for checking the quality of the headers, a data handling device for processing the headers and data records of the transportation vehicle(s), a transportation vehicle management device for managing the communication between the transportation vehicle and the backend, and an interface for communicating with a customer.

In summary, the method for monitoring the quality of the measured environmental data operates by virtue of the backend receiving only an excerpt of the data, the header, in advance and carrying out a quality check. If it can be identified, on the basis of the header, that the quality of the measured data is not sufficient, the header and therefore the data are rejected.

The following sequence is carried out for this purpose.

The sensor systems determine themselves, or by a central location, the extent to which the functionality of the sensors is available, is restricted or is not sufficient. Results and/or data arising in this case are collected.

Key figures from other sensors, which can estimate the quality of the sensor system, are determined. For example, a measurement of the brightness can be used to estimate the performance of camera systems.

These data are sent to the backend in collected form.

In the backend, the data are evaluated and it is estimated whether the performance of the sensor system or the external circumstances make(s) it possible to expect a sufficient quality.

If there is a sufficient quality, the sensor or the sensor system of the transportation vehicle is assessed as okay for swarm data activities and data are retrieved from the transportation vehicle as required.

If the quality is not sufficient, the data are not requested from the transportation vehicle or the upload of the header is rejected, thus resulting in no transport costs in the radio network.

FIG. 1 shows a schematic illustration of the apparatus for transmitting transportation vehicle-based data to a backend for the purpose of creating route-based data records. A transportation vehicle 1 travels on a current route section and uses a suitable sensor system 2 to generate environmental data relating to the relevant route section on which the transportation vehicle is currently situated. The data relating to the route section currently being traveled on, which are generated by the sensor system 2, are supplied to a device 3 for creating quality parameters relating to the sensor system 2. In this quality parameter device 3, it is determined, for example, on the basis of operating data, what state the functionality of the respective sensors in the sensor system 2 is in. For example, the functionality of a sensor in the sensor system 2 can be assessed as "functionality available", "functionality available to a restricted extent" or "functionality unavailable". The quality of the measurement by such a sensor in the sensor system 2 can be assessed on the basis of this parameter "functionality of a sensor". Furthermore, quality parameters for a particular sensor in the sensor system 2 can be determined by key figures from other sensors in the sensor system 2 or of the transportation vehicle. For example, it is possible to use a brightness sensor to determine the brightness outside the transportation vehicle which forms an indication or estimate of the current performance of an optical camera system in the sensor system 2.

These quality parameters for the sensors in the sensor system 2 are supplied, together with the environmental data from the sensor system 2, to a data aggregator 4 which combines the data to form data records relating to the route section currently being traveled on and buffers the data records, wherein, in addition to GPS data for locating the data record with regard to the route section for example, such a data record contains the measuring time and an identification of the measuring transportation vehicle. Furthermore, for each data record, the data aggregator 4 creates a summary, a so-called header, which describes the data record and comprises the quality parameters of the sensor system 2.

The transportation vehicle 1 also has a communication device 5 which is used by the transportation vehicle 1 to communicate with external devices by a radio path. Communication with a backend 6 takes place, wherein the transportation vehicle 1 registers with a transportation vehicle management device 10 of the backend 6 which controls the communication between the transportation vehicle 1 and the backend 6. After the transportation vehicle 1 has registered with the transportation vehicle management device 10, the communication device 5 of the transportation vehicle 1 continuously transmits headers to a communication device 7 of the backend 6 which possibly converts the received headers into a format compatible with the backend 6.

The headers which are transmitted by the transportation vehicle 1 via the communication device 5 and have the quality parameters of the sensor system 2 are supplied by the communication device 7 of the backend 6 to a device 8 for checking the quality of the sensor system 2, wherein a statement on the quality of the data record associated with a header can be derived from the quality check of the sensor system 2. In other words, a header supplied to the quality checking device 8 is checked and assessed with respect to the quality parameters in the header.

If the check of the quality parameters in a header reveals that the sensor system 2 carrying out the measurement had a sufficient quality, the header is transferred, as a header which has been checked in terms of quality, to the data handling region 9 for the transportation vehicle data. If it is identified in the data handling region 9 of the backend 6 that there is an interest in this header from a customer 12, the data handling 9 retrieves the associated data record via the transportation vehicle management device 10 which causes the request for the data record to be sent to the communication device 5 of the transportation vehicle 1, with the result that the communication device 5 asks the data aggregator 4 of the transportation vehicle 1 to transmit the data record associated with the header. This data record is then transferred, via a wireless communication path, to the communication device 7 of the backend 6, is reformatted there into a data format appropriate to the backend 6 and is supplied to the data handling 9 via the quality check 8, wherein the data record can be checked, for example, for plausibility, in the quality check 8, but need not be checked, since the associated header has already been checked. In the data handling 9, the data records provided for a customer 12 are collected and are delivered to the customer 12 via the interface 11.

In this case, the interface 11 which ensures the communication between a customer 12 and the backend 6 is bidirectional, and the customer 12 can communicate his order requests with respect to the desired data and the desired route sections to the data handling 9 via the interface 11. Furthermore, it is possible, via this interface, for the customer to communicate to the data handling 9 which measurements are intended to be carried out with which measurement parameters for which route sections.

If the check of the quality parameters of the sensor system in a header reveals in the quality check 8 that the sensor system 2 did not have a sufficient quality when carrying out the corresponding measurements for the associated data record, the received header is deleted and the corresponding data record stored in the transportation vehicle can therefore no longer be retrieved.

Data records which have not been retrieved and are stored in the data aggregator 4 of the transportation vehicle 1 are usually deleted after expiry of a predefined storage time. In this manner, data records which have either been classified as insufficient on account of the quality parameters or data records which are not required owing to a lack of a customer 12 and are therefore not retrieved are deleted after a predefined time. This does not produce any transport costs in the radio network for data records which are not required.

A typical exemplary sequence of the method for determining route-based data is as follows, in summary.

During its journey on a route section, the transportation vehicle 1 uses its sensor system 2 to measure data relating to the current environment, for example, the above-mentioned environmental data such as geo-information, traffic data, location-based event data and/or location-based state data. Furthermore, quality parameters relating to the sensor system 2 used are determined in the quality parameter device 3. In the data aggregator 4 of the transportation vehicle 1, the data are combined with the quality parameters to form data records and are stored. Furthermore, in the data aggregator 4 of the transportation vehicle 1, a summary is created for each data record, the so-called header. This header is continuously transmitted by the communication device 5 of the transportation vehicle 1 to the communication device 7 of the transportation vehicle data backend 6, is reformulated there into a suitable format and is supplied to a quality check 8 which determines, on the basis of the quality parameters in the header, whether the measurements stored in the data record belonging to the header have a sufficient quality due to the sensors. If this is the case, the header is supplied to the data handling 9 for further processing and storage.

If the quality check 8 of the respective header has revealed that the associated measurements have a poor quality due to the sensors on the basis of the quality parameters in the header, the header is deleted, which results in the associated data record in the transportation vehicle being deleted after a predefined time owing to the passage of time.

A customer or client 12 instructs the collection of environmental data relating to one or more predefined route sections of a road or freeway via the interface 11 of the backend 6, in which case it is also possible to state further boundary conditions, for example, the number of measurements per route section and/or desired measuring time intervals. These requirements are forwarded to the data handling 9 of the backend 6 which checks, on the basis of its headers stored in a database, whether the desired data records are possibly available in a transportation vehicle which is currently traveling on the route sections desired by the customer 11, for example, the transportation vehicle 1.

If the data handling 9 of the transportation vehicle data backend 6 has identified, on the basis of the available headers of the transportation vehicle 1, that data records corresponding to the requirements of the customer 12 are available in the transportation vehicle 1, the data handling 9 instructs the transportation vehicle management device 10 to acquire the complete data records available in the transportation vehicle 1.

On account of the instruction to the transportation vehicle management device 10, the latter prompts the communication device 5 of the transportation vehicle 1 to transmit the complete data records associated with the header(s) from the data aggregator 4 to the communication device 7 of the backend 6.

After a possible renewed quality check 8 of the transmitted data records, they are transferred to the data handling 9, are preprocessed there in a suitable manner for the customer 12 and are forwarded to the customer via the interface 11. To protect the privacy of the transportation vehicle 1, the data records can also be masked in the data handling 9 by virtue of the transmitted data records being made spatially and/or temporally noisy, for example.

LIST OF REFERENCE SIGNS

1 Transportation vehicle
2 Sensor system
3 Quality parameter device of the sensor system
4 Data aggregator of the transportation vehicle
5 Communication device
6 Backend
7 Communication device
8 Quality check
9 Data handling
10 Transportation vehicle management
11 Interface between backend and customer
12 Customer/user

The invention claimed is:

1. An apparatus for use in a system for transmission of transportation vehicle-based environmental data relating to a transportation vehicle traveling on a predefined road section to collect data relating to the predefined road section, the apparatus comprising:
at least one environment sensor for determining environmental data, wherein performance of the at least one environment sensor is described by quality parameters, and the quality parameters relate to the functionality of the at least one environmental sensor; and
a communication device for communication between the transportation vehicle and a system backend, wherein the communication device transmits data records created from the environmental data and the quality parameters and a header that includes a summary for each data record, wherein, the header indicates whether quality parameters comply with a predetermined standard.

2. The apparatus of claim 1, wherein the quality parameters determine the quality of a sensor in the sensor system based on the measured values from another sensor in the sensor system or the measured values from a further sensor of the transportation vehicle.

3. The apparatus of claim 1, wherein the predefined standard determines whether or not the performance of the sensor system is sufficient to carry out measurements.

4. The apparatus of claim 1, wherein an associated data record is retrieved from the transportation vehicle as a function of the header.

5. The apparatus of claim 4, wherein the retrieved data record is stored in the system backend for further use.

6. The apparatus of claim 4, wherein a data record is retrieved when there is a corresponding request from a customer as a function of the header.

7. The apparatus of claim 4, wherein the request for data records relating to a predefined route section is given by a customer who communicates exclusively with the system backend via an interface.

8. The apparatus of claim 7, wherein the customer determines the measurement parameters of the data record relating to a predefined route section, with the result that the system backend determines whether corresponding data records are retrieved from the transportation vehicle or transportation vehicles and are made available to the customer based on the headers provided by the transportation vehicle.

9. A system for transmission of transportation vehicle-based environmental data relating to a transportation vehicle traveling on a predefined road section to collect data relating to the predefined road section, the system comprising:
the apparatus of claim 1,
wherein the system backend, with which the transportation vehicle apparatus communicates, is configured to collect the data relating to the predefined road section, the system backend including a communication device for communicating with the transportation vehicle apparatus or apparatuses included in a plurality of transportation vehicles, and further including a quality check,
wherein the system backend is further configured to process headers and corresponding data records of the transportation vehicle apparatus or apparatuses included in the plurality of transportation vehicles, manage the communication between the transportation vehicle apparatus or apparatuses included in the plurality of transportation vehicles and the system backend, and communicate with a customer,
wherein each communicated header corresponds to a data record created from the at least one environmental sensor or a respective at least one sensor of the apparatuses included in the plurality of transportation vehicles,
wherein, in response to a respective header being transmitted to the system backend, the quality parameters of the respective header are checked, wherein the respective header is rejected in response to the quality parameters not complying with a predetermined standard, and wherein the respective header is retained for further processing in response to the quality parameters complying with the predetermined standard.

10. A method for transmitting transportation vehicle-based environmental data relating to at least one transportation vehicle traveling on a predefined road section to a system backend for collecting data relating to the predefined road section, the method comprising:

generating data relating to the environment of the transportation vehicle by at least one environment sensor;

generating quality parameters relating to the at least one environment sensor in an environment sensor system, wherein the quality parameters enable a statement regarding the performance of the at least one environment sensor;

combining the quality parameters and the measurement data to form a data record and creating a header that provides a summary relating to the data record;

transmitting the header to the system backend; and checking the quality parameters of the header, wherein the header is rejected in response to the quality parameters not complying with a predetermined standard, and the header is retained for further processing in response to the quality parameters complying with the predetermined standard, and wherein the quality parameters relate to the functionality of the at least one environment sensor in the environment sensor system.

11. The method of claim 10, wherein the quality parameters determine the quality of at least one environment sensor in the environment sensor system based on the measured values from another sensor in the environment sensor system or the measured values from a further sensor of the transportation vehicle.

12. The method of claim 10, wherein the predefined standard determines whether or not the performance of the environment sensor system is sufficient to carry out measurements.

13. The method of claim 10, wherein an associated data record is retrieved from the transportation vehicle as a function of the header.

14. The method of claim 13, wherein the retrieved data record is stored in the system backend for further use.

15. The method of claim 13, wherein a data record is retrieved when there is a corresponding request from a customer as a function of the header.

16. The method of claim 13, wherein the request for data records relating to a predefined route section is given by a customer who communicates exclusively with the system backend via an interface.

17. The method of claim 16, wherein the customer determines the measurement parameters of the data record relating to a predefined route section, with the result that the system backend determines whether corresponding data records are retrieved from the transportation vehicle or transportation vehicles and are made available to the customer based on the header provided by the transportation vehicle.

* * * * *